Figure 1:
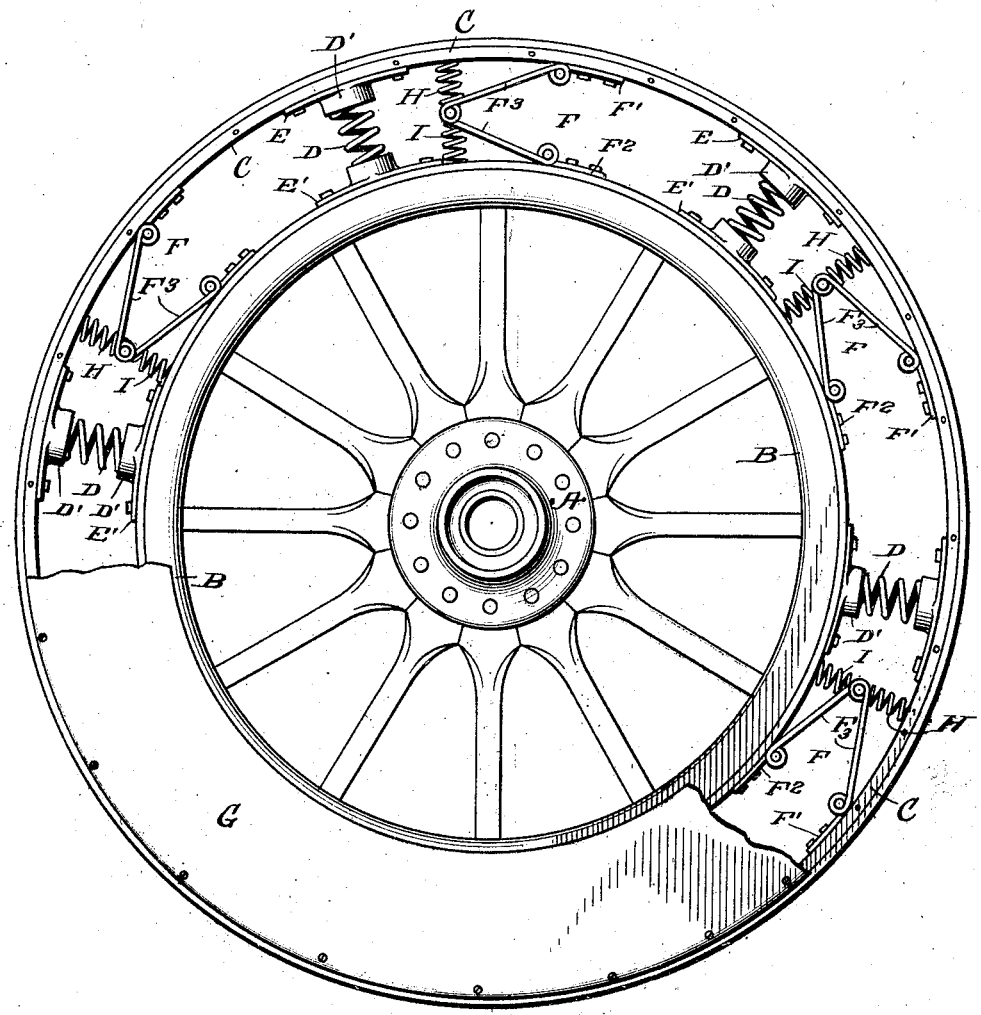

G. M. BADGER.
WHEEL.
APPLICATION FILED APR. 20, 1908.

923,001.

Patented May 25, 1909.
2 SHEETS—SHEET 1.

WITNESSES

INVENTOR
GEORGE M. BADGER,
BY
ATTORNEYS

G. M. BADGER.
WHEEL.
APPLICATION FILED APR. 20, 1908.
923,001.
Patented May 25, 1909.
2 SHEETS—SHEET 2.
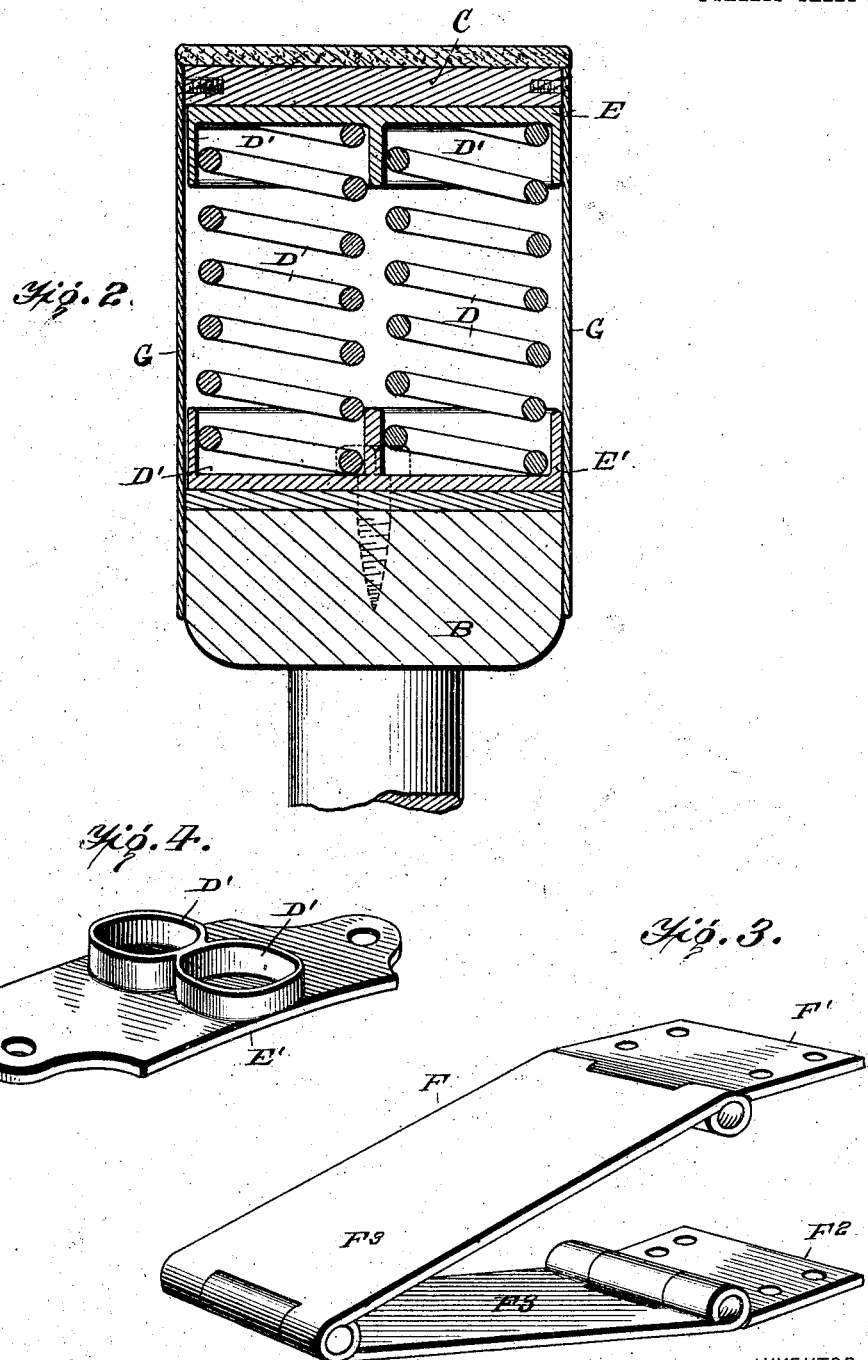
WITNESSES
INVENTOR
GEORGE M. BADGER,
BY
ATTORNEYS

UNITED STATES PATENT OFFICE.

GEORGE MARCELLUS BADGER, OF QUITMAN, GEORGIA.

WHEEL.

No. 923,001.　　　　Specification of Letters Patent.　　　Patented May 25, 1909.

Application filed April 20, 1908. Serial No. 428,173.

*To all whom it may concern:*

Be it known that I, GEORGE M. BADGER, a citizen of the United States, and a resident of Quitman, in the county of Brooks and State of Georgia, have invented certain new and useful Improvements in Wheels, of which the following is a specification.

This invention is an improvement in spring wheels and consists in certain novel constructions and combinations of parts as will be hereinafter described and claimed.

In the drawings, Figure 1 is a side view of a wheel embodying my invention, with parts broken away. Fig. 2 is a cross section thereof. Fig. 3 is a detail view of one of the hinge connections between the body and the tire or rim, and Fig. 4 is a detail view illustrating the plates for securing the springs.

In carrying out the invention I employ a wheel body, which may be formed with a suitable hub A, and a rim B, and surrounding this rim and spaced apart therefrom I provide what for convenience of reference I term a tire C, and this tire is yieldingly supported from the body of the wheel so it can operate with a cushion action in the use of the wheel. To this end springs D are arranged at intervals around the body of the wheel and bear between the same and the tire C. These springs D may be arranged in series side by side as shown in Fig. 2 when a wheel having a very broad tread is employed, or the springs may be arranged in a single series or the number of springs may be increased with very wide tired wheels.

In supporting the springs I prefer to employ plates E and E' secured respectively, upon the outer side of the rim B and the inner side of the tire C and having sockets D' receiving their respective ends of the springs, and thus operating in a simple manner to retain the springs in the desired relation to the rim and the tire. These springs support the tire yieldingly from the body of the wheel and permit the cushion action as desired.

To preserve the wheel body and tire in the desired circumferential relation and yet permit the yielding of the tire in action, I provide a series of hinge connections F, between the wheel body and the tire and intermediate the springs. These hinge connections comprise the end plates F' and F², which are bolted, riveted or otherwise secured respectively in the outer side of the wheel body and the inner side of the tire, and leaves F³ hinged together at one end and at their other ends to their respective base plates F' and F². The hinge joint between the leaves F³ permits the desired yielding action between the tire and the wheel body. The rigid or inflexible leaves operate to prevent independent circular motion of the tire and wheel body thus preserving said parts in the desired relation.

A housing, comprising the annular plates G, is provided for protecting the operating parts between the wheel body and the tire from mud and the like. These housing plates G are secured at their outer edges to the tire and extend thence inwardly to a point about midway between the outer and inner edges of the rim B, and cover the space between the rim B and the tire C without interfering with the yielding action desired in the operation of the invention.

It will be noticed that the hinge connection between the wheel body and tire has a three joint suspension and the body of the wheel will drive the tire and the wheel will stand side motion or strain without deranging any of the connections.

In Fig. 1, I show springs H and I bearing between the hinge connection and, respectively, the tire C and the rim B, and operating to prevent the hinge from striking on the outer or inner tire in starting or backing the machine.

I claim—

1. The herein described improvement in wheels comprising a wheel body having a rim, a tire surrounding the rim and spaced apart therefrom, a three-joint suspension hinge having inflexible leaves pivoted together at one end, base plates pivoted to the other ends of their respective leaves and held respectively, to the inner side of the tire and the outer side of the wheel body rim, coil springs bearing between the jointed ends of the hinge leaves and the inner side of the tire and the outer side of the wheel body rim, and springs independent of the three joint suspension hinge for giving resilience to the wheel, all substantially as and for the purposes set forth.

2. The combination of a wheel body, a rim surrounding and spaced apart therefrom, a hinge leaf hinged at one end to the rim, a hinge leaf hinged at one end to the wheel body, said hinge leaves being inflexible, a hinge connection between the other ends of said leaves at points midway between the wheel body and rim, coil springs bearing between said hinge connection of the leaves and the wheel body and rim, and springs independent of the leaves and bearing between the wheel body and rim, substantially as set forth.

3. The combination with the wheel body and the rim, and springs bearing between the same, of three joint suspension hinges located between the said springs and between the wheel body and the rim and composed of inflexible leaves hinged together at one end and hinged at their other ends respectively, to the wheel body and rim, and springs bearing between the jointed ends of the leaves and the rim and wheel body, substantially as set forth.

GEORGE MARCELLUS BADGER.

Witnesses:
 CHAS. H. BENINGTON,
 GEORGE D. RAYSOR.